(12) United States Patent
Jones et al.

(10) Patent No.: US 11,432,543 B1
(45) Date of Patent: Sep. 6, 2022

(54) ORGAN PRESERVATION SYSTEM WITH AUTOMATIC PRIMING AND AIR REMOVAL

(71) Applicant: Bridge to Life Ltd., Northbrook, IL (US)

(72) Inventors: Lawrence R. Jones, Conifer, CO (US); Kenneth E. Marte, Southlake, TX (US); David W. Wright, Littleton, CO (US)

(73) Assignee: BRIDGE TO LIFE LTD., Northbrook, IL (US)

( * ) Notice: Subject to any disclaimer, the term of this patent is extended or adjusted under 35 U.S.C. 154(b) by 0 days.

(21) Appl. No.: 17/495,765

(22) Filed: Oct. 6, 2021

(51) Int. Cl.
*A01N 1/02* (2006.01)

(52) U.S. Cl.
CPC .................................. *A01N 1/0242* (2013.01)

(58) Field of Classification Search
None
See application file for complete search history.

(56) References Cited

U.S. PATENT DOCUMENTS

| | | | | |
|---|---|---|---|---|
| 4,190,426 A | * | 2/1980 | Ruschke | B01D 19/0031 96/219 |
| 5,586,438 A | * | 12/1996 | Fahy | F25D 16/00 435/284.1 |
| 5,951,870 A | * | 9/1999 | Utterberg | A61M 1/3647 210/252 |
| 2004/0221719 A1 | * | 11/2004 | Wright | A61M 1/3627 96/155 |

* cited by examiner

*Primary Examiner* — William H. Beisner
(74) *Attorney, Agent, or Firm* — Jones Day

(57) ABSTRACT

An organ preservation system includes a housing, an organ perfusion circuit disposed within the housing, and a dual direction bubble trap disposed within the organ perfusion circuit. The dual direction bubble trap can include an upper interior chamber, a lower interior chamber, an air vent valve, and a hydrophobic membrane disposed between the upper interior chamber and the air vent valve. During operation, when fluid is pumped by a fluid pump into the dual direction bubble trap from either a retrograde or antegrade direction, air passes through the hydrophic membrane and is vented through the air vent valve until such time that the interior chamber is full of fluid which causes the air vent valve to close. Related apparatus, systems, techniques and articles are also described.

20 Claims, 13 Drawing Sheets

ORGAN PRESERVATION SYSTEM WITH AUTOMATIC PRIMING AND AIR REMOVAL

TECHNICAL FIELD

The subject matter described herein relates to an organ transport system with a perfusion circuit having automatic priming and air removal.

BACKGROUND

During preservation and transport of donor organs for transplant, it may be desirable to perfuse organs with perfusate to provide nutrients, oxygen, and/or pharmaceutical/preservation agents to the organs. During organ perfusion, it is important to protect the organ from the introduction of air or air bubbles into the organ's vasculature in order to prevent the formation of air embolisms that may damage the organ.

Organ perfusion is typically achieved by use of an organ perfusion circuit that includes (at a minimum) a pump, tubing, and a fluid reservoir. Prior to perfusing the organ, the organ perfusion circuit must be primed with perfusate to prevent air from being pumped into the organ. In addition, air at the interface between the organ and the primed circuit must be mitigated, and there must be a mechanism present to remove any additional air bubbles that are introduced (or dislodged) and may flow toward the organ after the circuit has been primed and perfusion has commenced. The dislodging of bubbles not originally mitigated during priming may occur during transport due to normal shocks and vibrations encountered in airplanes, automobiles, and carrying the portable perfusion device, as well as setting it down onto a surface.

SUMMARY

In a first aspect, an organ preservation system includes a housing, an organ perfusion circuit disposed within the housing, a bi-directional fluid pump, and a dual direction bubble trap disposed within the organ perfusion circuit.

The dual direction bubble trap can include an upper interior chamber, a lower interior chamber, an air vent valve, and a hydrophobic membrane disposed between the upper interior chamber and the air vent valve.

Air bubbles that collect on the membrane can be forced through the hydrophobic membrane and vented to atmosphere when the antegrade fluid valve is opened.

During operation, when fluid is pumped into the dual direction bubble trap from either a retrograde or antegrade direction, air passes through the hydrophobic membrane and is vented through the air vent valve until such time that the interior chamber is full of fluid which causes the air vent valve to close.

The dual direction bubble trap can also include a lower interior chamber and an antegrade fluid valve which is configured to open, and allow flow into the lower interior chamber, when fluid is pumped in the antegrade direction and an amount of fluid within the upper interior chamber is above a threshold.

The system can also include a pump configured to bi-directionally pump fluid through the organ perfusion circuit.

A pressure sensor can be within or in communication with the lower interior chamber configured to detect a change in pressure caused by the antegrade fluid valve opening. The detection of the change in pressure by the pressure sensor can cause the pump to stop pumping fluid. The pump can cause the direction of fluid flow to subsequently reverse in the retrograde direction after the pump stops pumping fluid in response to a detected change in pressure by the pressure sensor.

The dual direction bubble trap can include a retrograde fluid valve which is configured to open and allow flow, from the lower interior chamber to the upper interior chamber, when fluid is pumped in the retrograde direction.

An air sensor can be used which is configured to detect air bubbles during perfusion. If the air sensor detects a level of bubbles above a pre-defined threshold is detected by the air bubble detector, a signal is sent to the fluid pump causing the fluid pump to cease pumping fluid in the antegrade direction and reverse fluid pumping in the retrograde direction until the air bubbles are removed by the bubble trap.

The subject matter described herein provides many technical advantages. For example, the automatic priming of an organ perfusion circuit obviates the need for user intervention to manually prime the organ perfusion circuit. A manual priming process is prone to human error, requires observations, judgements and actions from a trained user, and may take more time than an automated priming process.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to an organ transport system that includes a perfusion circuit that is configured to be automatically primed and, additionally, is configured to automatically remove air (including air bubbles).

Figure 1:
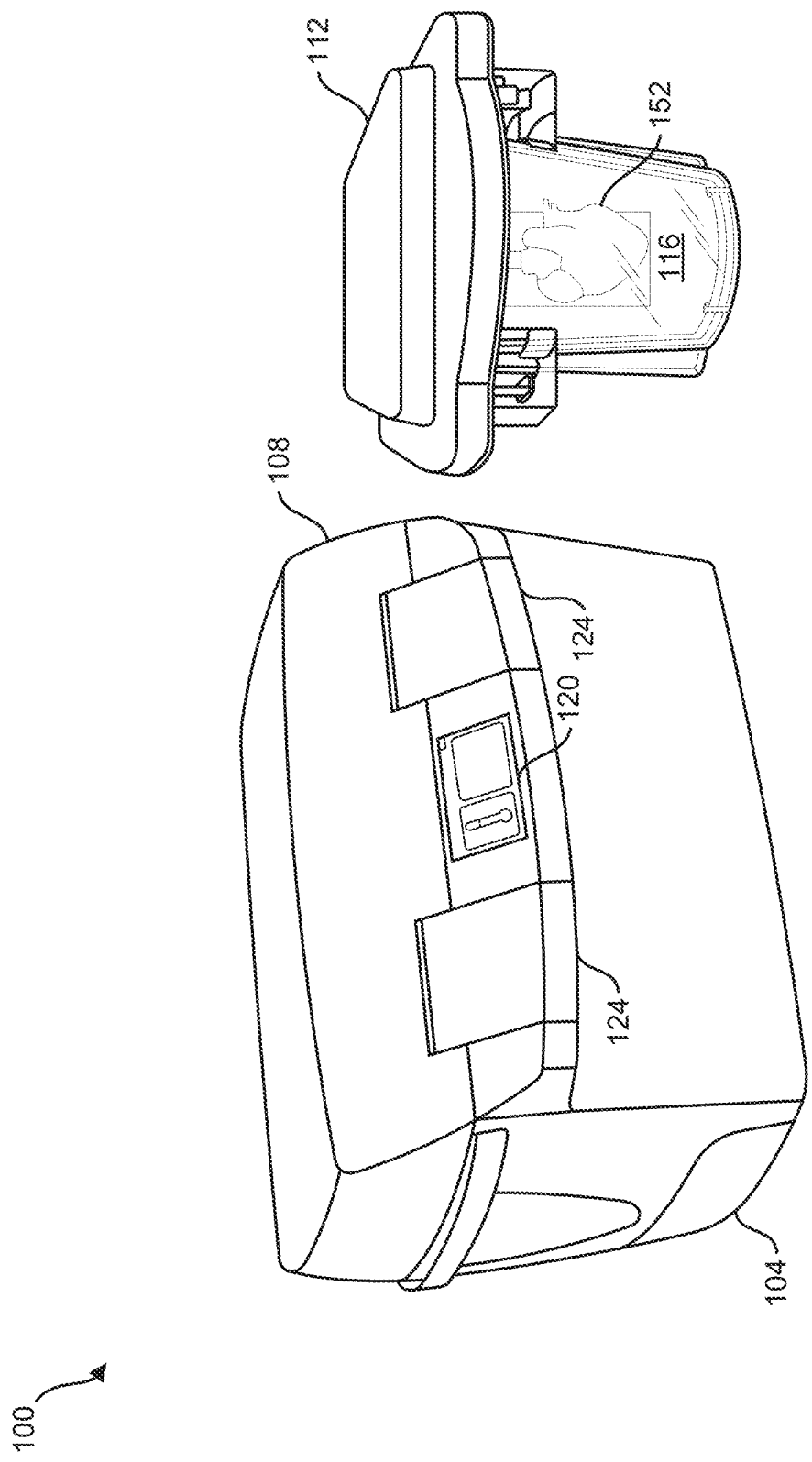
FIG. 1 is a diagram illustrating an organ transport system including a transport module.
Figure 2:
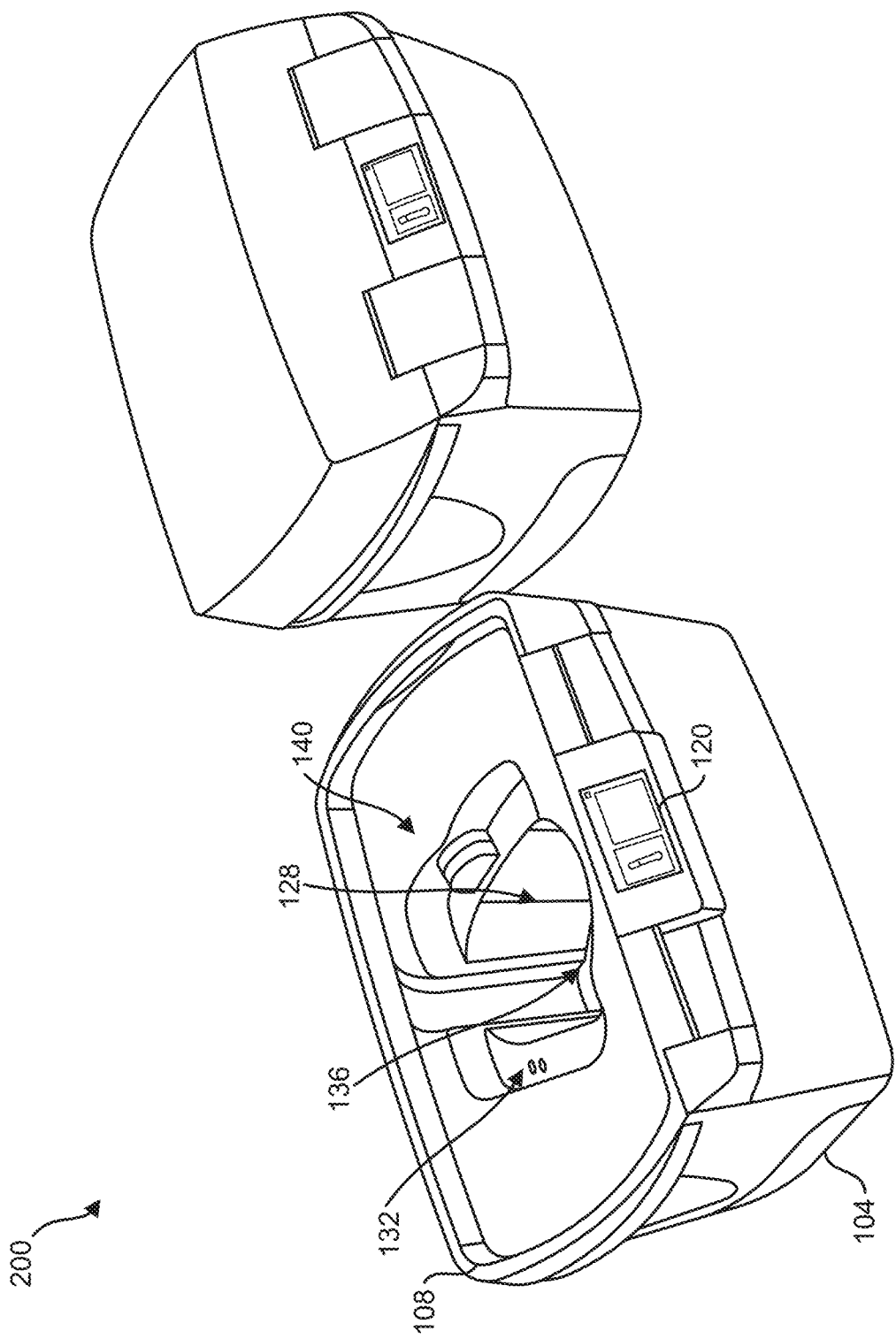
FIG. 2 is a diagram illustrating the organ transport system with a lid in an open position.

FIG. 1 is a diagram 100 of an example organ transport system having an outer housing 104 in which a transport module 112 comprising a chamber 116 for storing an organ can be disposed therein. The housing 104 can include or otherwise be coupled to a movable lid 108 which can include hinges or other connection mechanisms to allow for access to an inner housing 128. The movable lid 108 can be secured by one or more securing mechanisms 124 such as clasps or locks. In some variations, the movable lid 108 can be slid backwards (as illustrated in FIG. 2) while, in other variations, the movable lid 108 can be completely removed in relation to the remainder of the outer housing 104. The outer housing 104 can incorporate various sensors and circuitry (e.g., processors, memory, etc.) to control such circuitry and provide various control and status information.

An interface 120 can also be included on a surface of the outer housing 104. The interface 120 can, for example, be a touch screen interface which can convey status information regarding an organ being transported and/or the interface 120 can be used to control one or more operational parameters relating to the organ transport system (e.g., temperature, fluid circulation rate, oxygenation level, etc.). In some variations, the interface 120 can be an angled screen that is optimized for viewing by a user.

With reference to diagram 200 of FIG. 2, the organ transport system also includes an inner housing 128 which is accessible through movement of the movable lid 108. The inner housing 128 has a size and shape configured to receive and secure the transport module 116. The transport module 116 can have various ports or other types of connectors allowing it to interact with a gas connector 132, an electrical connection 126, and a pump 140 which can be selectively operated in both directions (i.e., the pump 140 can be a bi-directional pump).

Figures 3, 4, 5:
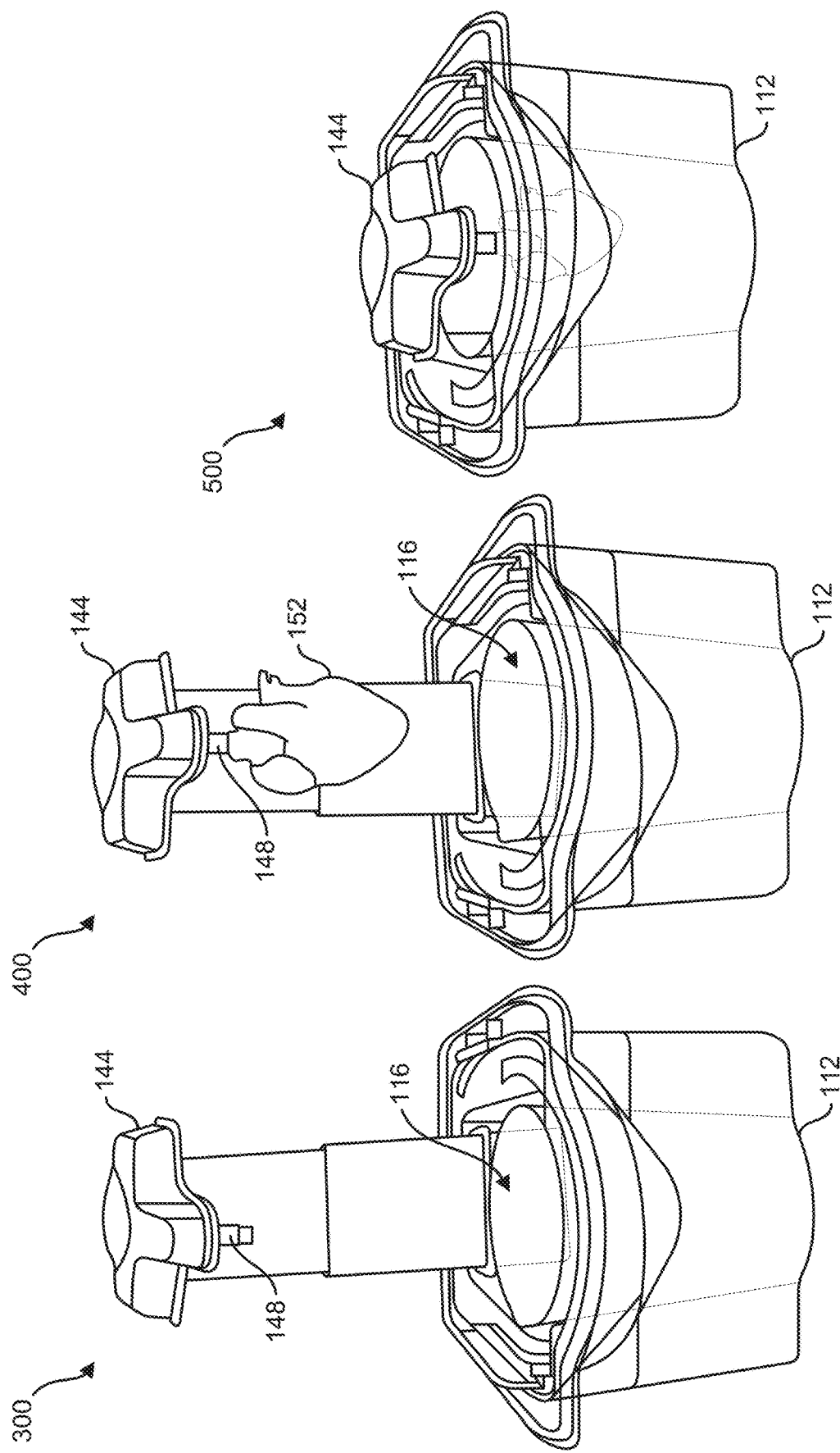
FIGS. 3-5 are diagrams illustrating use of the transport module.

FIGS. 3-5 are diagrams 300-500 illustrating innovative aspects relating to the transport module 116. In particular, the organ transport module 12 can include a telescoping arm 144 such that the telescoping arm 144 can be raised in order to receive an organ 152 (in this example a heart). The organ 152 can be secured, for example, via a securing mechanism 148 which can have a shape and size tailored to the type of organ 152 being transported. Various securing mechanisms 148 can include both of an organ adapter cannula (sized and secured to the organ before connection to the system) and a quick-connect/-disconnect connector which is permanently connected to the perfusion circuit and mounted as part of the telescoping arm. The adapter cannula can includes a first end (with, for example, an 'hourglass' profile) for insertion into, and securable attachment to, the organ vessel being perfused and a second end designed for insertion into the connector. Multiple sizes of adapter cannulas can be provided to match the lumen size of the receiving organ vessel. Once inserted into the vessel, the adapter cannula can be secured to the vessel by wrapping/tying a length of umbilical tape (or similar) around the vessel at the narrow portion of the hourglass profile. The combined cannula adapter and connector can be configured to allow a quick and easy 'click-in' connection. The components can be disconnected with a 'button' feature on the connector. The connecting portion of the cannula adapter can be sealed to the connector with an O-ring (or similar) to provide a fluid-tight connection.

Figure 6:
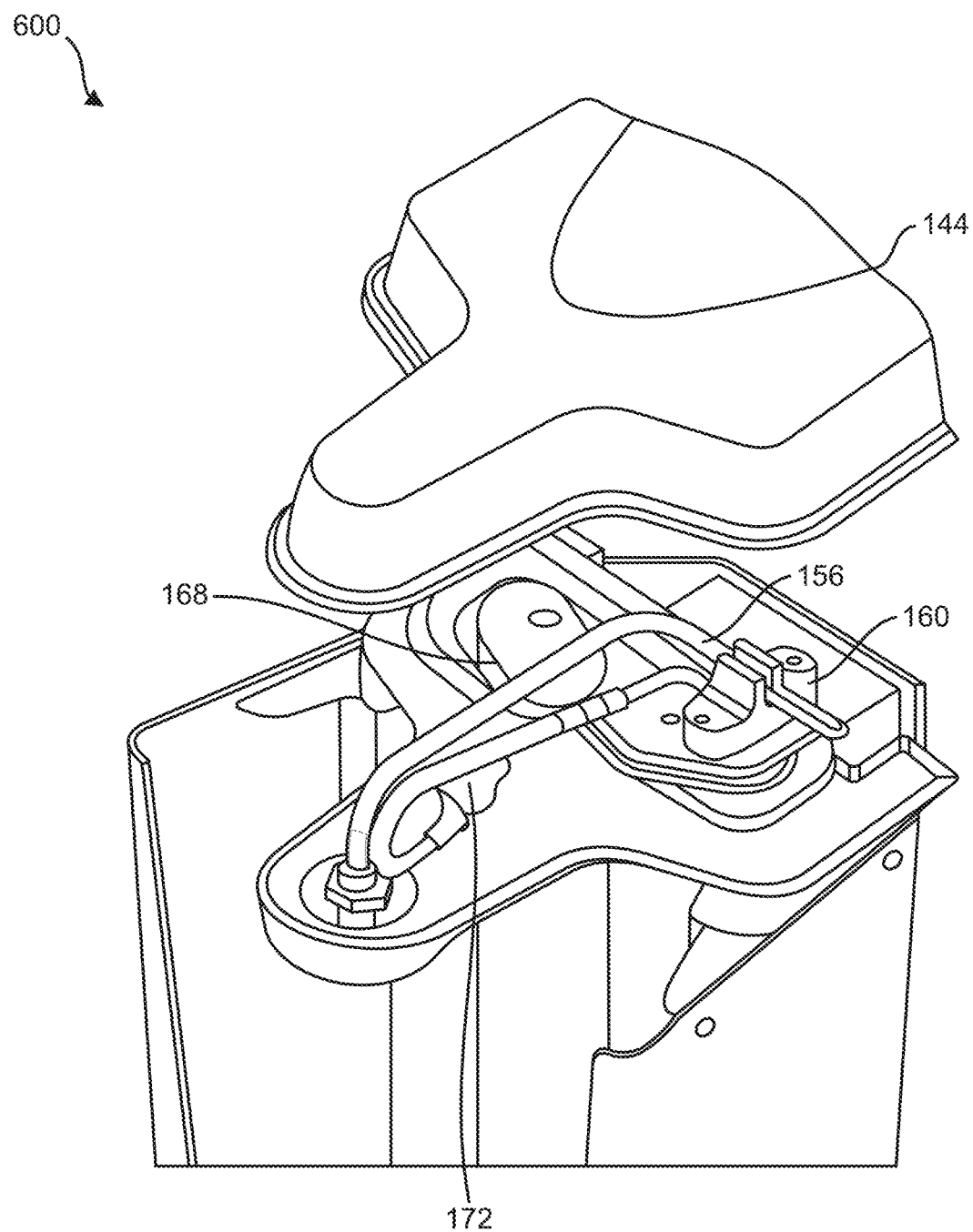
FIGS. 6-10 are diagrams illustrating various aspects of the transport module.
Figure 7:
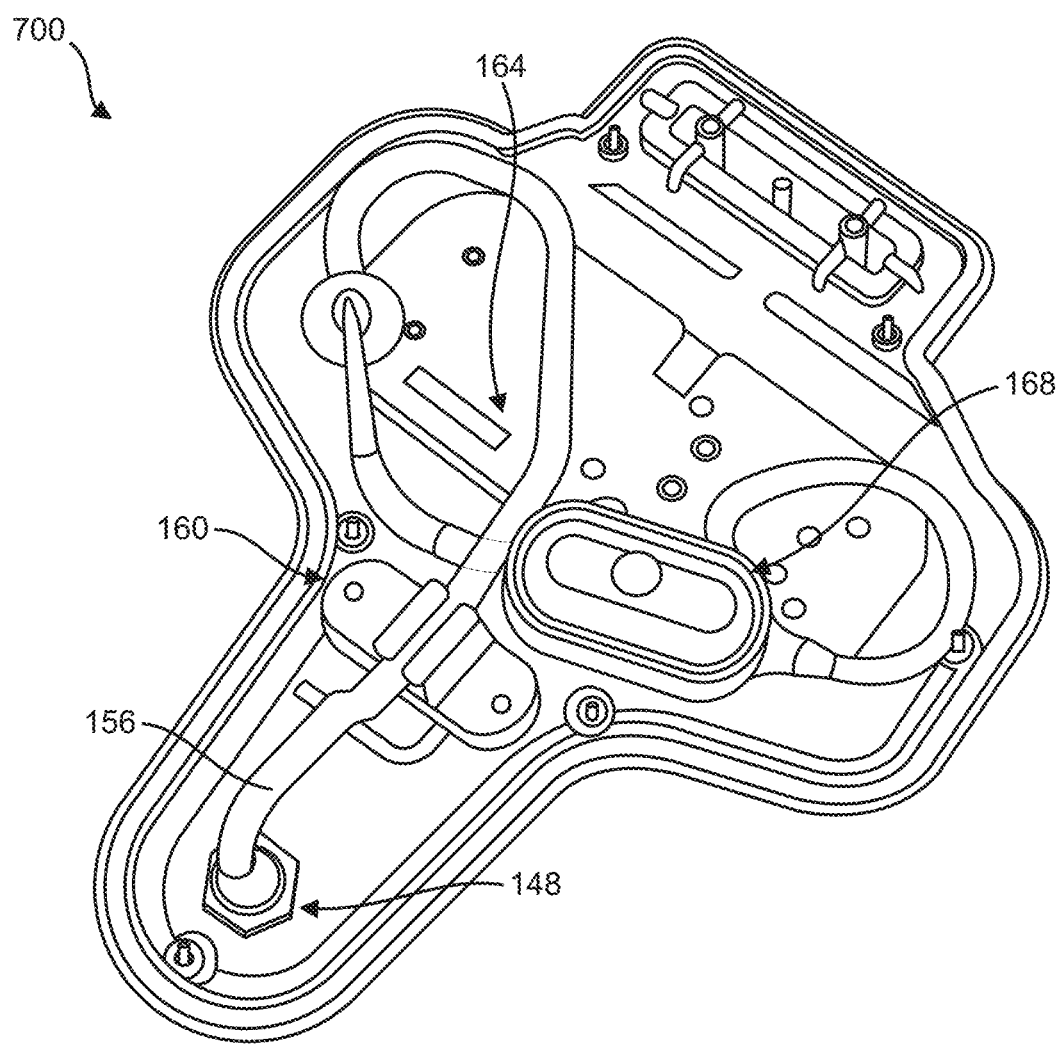
Figures 8, 9, 10:
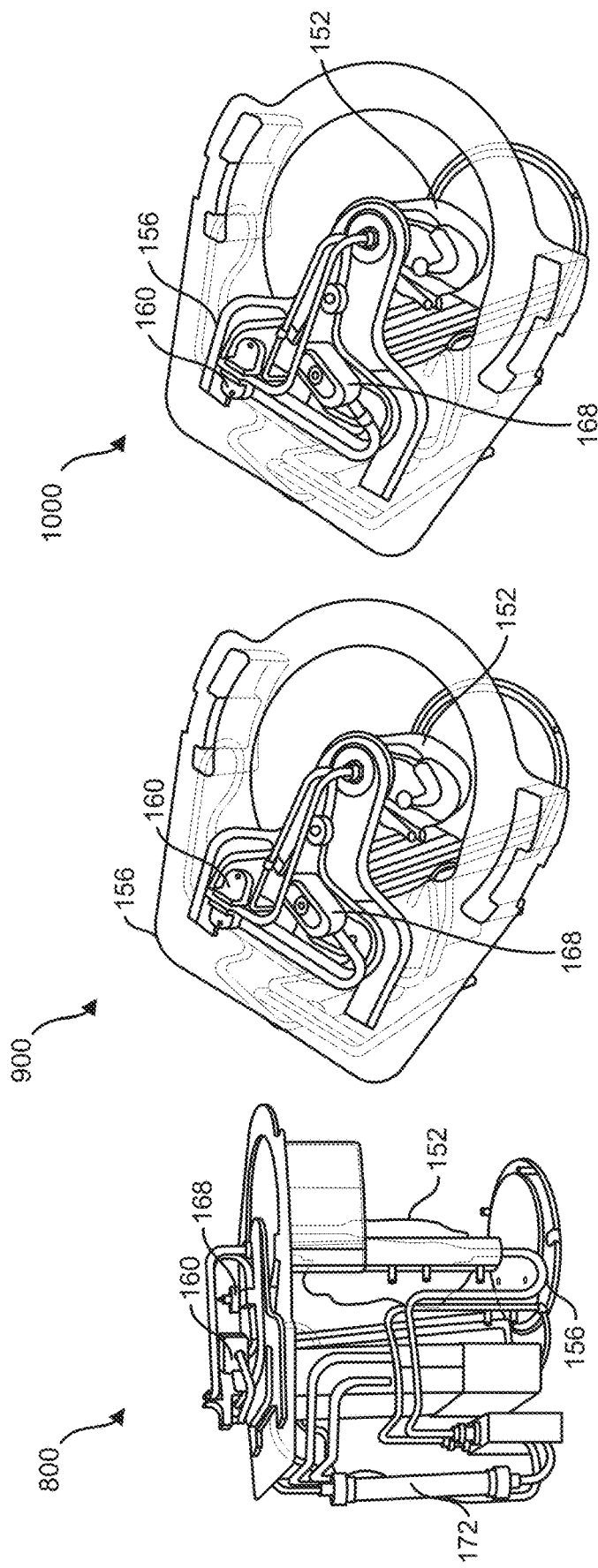

Diagram 600 of FIG. 6 shows additional aspects regarding the telescoping arm 144. In particular, the telescoping arm 144 can house a portion of a perfusion circuit 156 such that perfusate can be delivered to the organ 156 by way of an opening (or series of openings) in the securing mechanism 148. These aspects are further illustrated in diagram 700 of FIG. 7 in which there are various elements within and/or coupled to the perfusion circuit 156. For example, an in-line air sensor 160 can identify bubbles and the like in the fluid (i.e., perfusate, etc.) being circulated within the perfusion circuit 156. The in-line air sensor 160 can take various forms including an ultrasonic sensor and/or an optical sensor. A flow sensor 164 can also detect a rate of flow of fluid (i.e., perfusate, etc.) within the perfusion circuit 156. Further, as will be describe in further detail below, the telescoping arm 144 can enclose a bubble trap 168 which is in-line with the perfusion circuit 156. The bubble trap 168 can act to remove undesired air or other gaseous elements within the perfusion circuit 156 originating from various conditions including initial priming, fluid purging, as well as movement of the organ transport system and the like. A temperature sensor 172 can also provide temperature of the chamber 116 and/or the perfusate in the perfusion circuit 156. Diagrams 800-1000 of FIGS. 8-10 provide different views of the organ transport module 112 with certain elements being illustrated as transparent or with certain elements intentionally being omitted. Also illustrated in FIG. 8 is an oxygenator which can provide oxygen to the perfusate while, at the same time, removing carbon dioxide from the perfusate.

Figure 11:
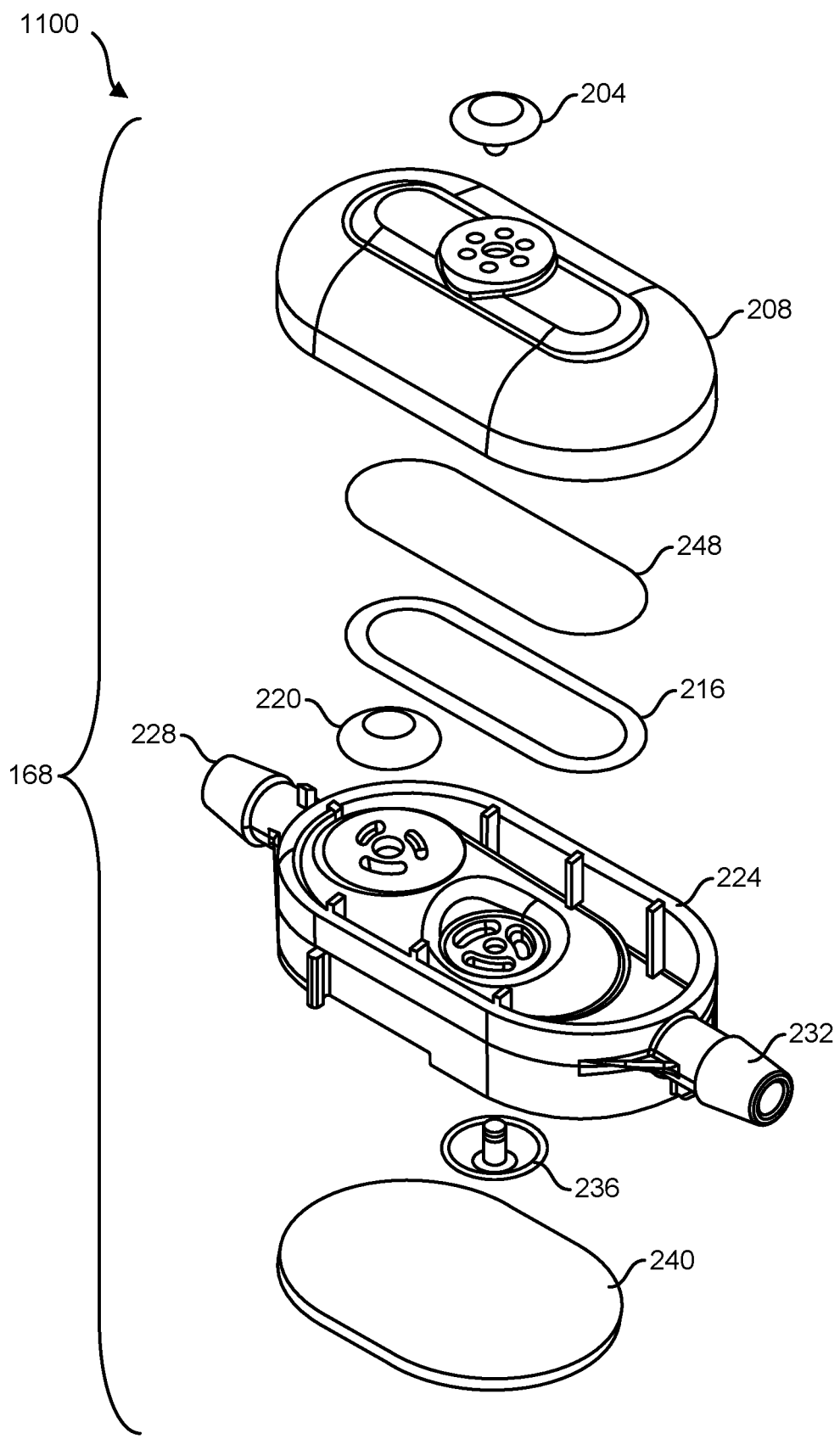
FIG. 11 is a diagram illustrating an exploded view of a first bubble trap configuration.
Figure 12:
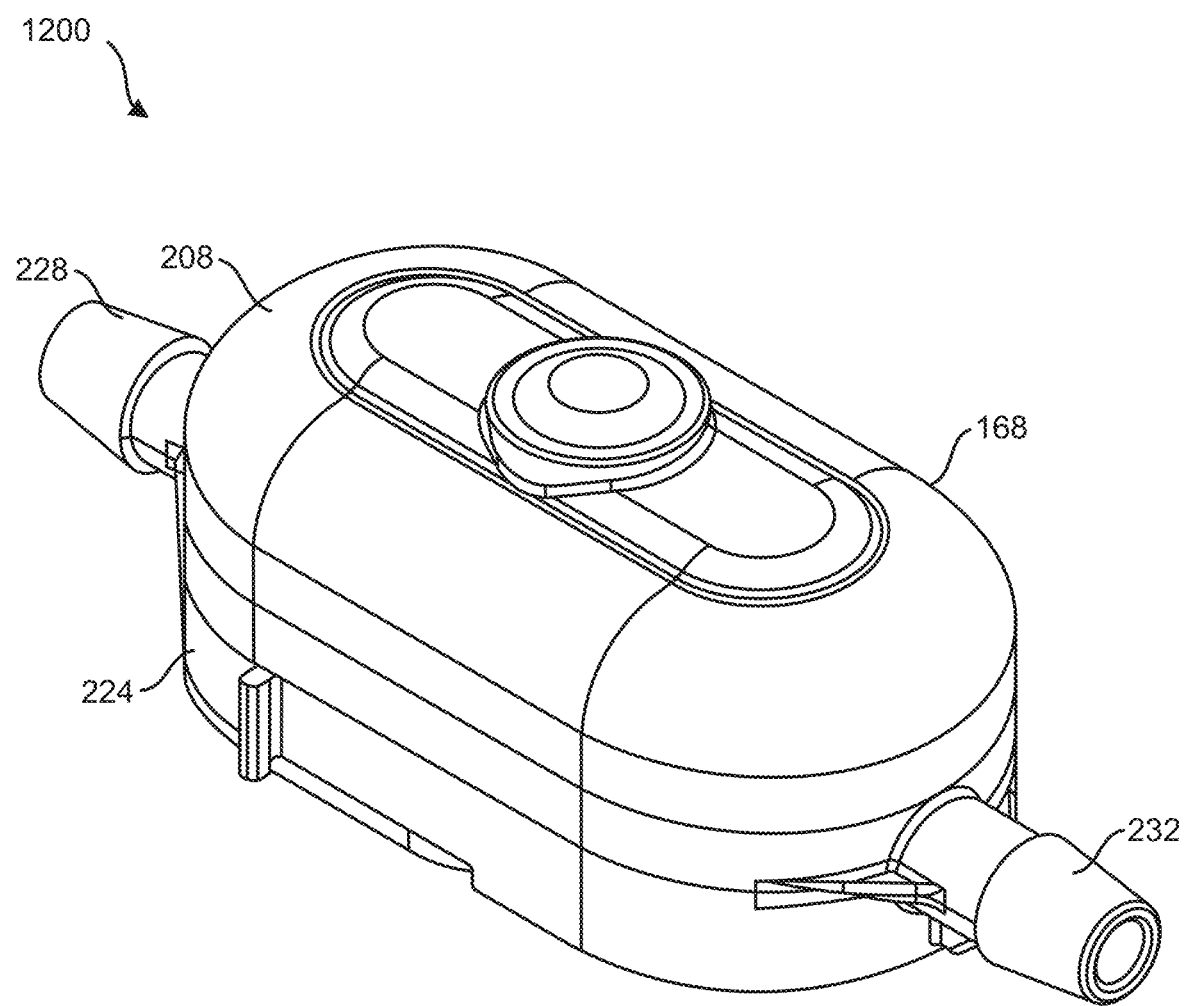
FIG. 12 is a diagram illustrating a perspective view of the first bubble trap configuration.
Figure 13:
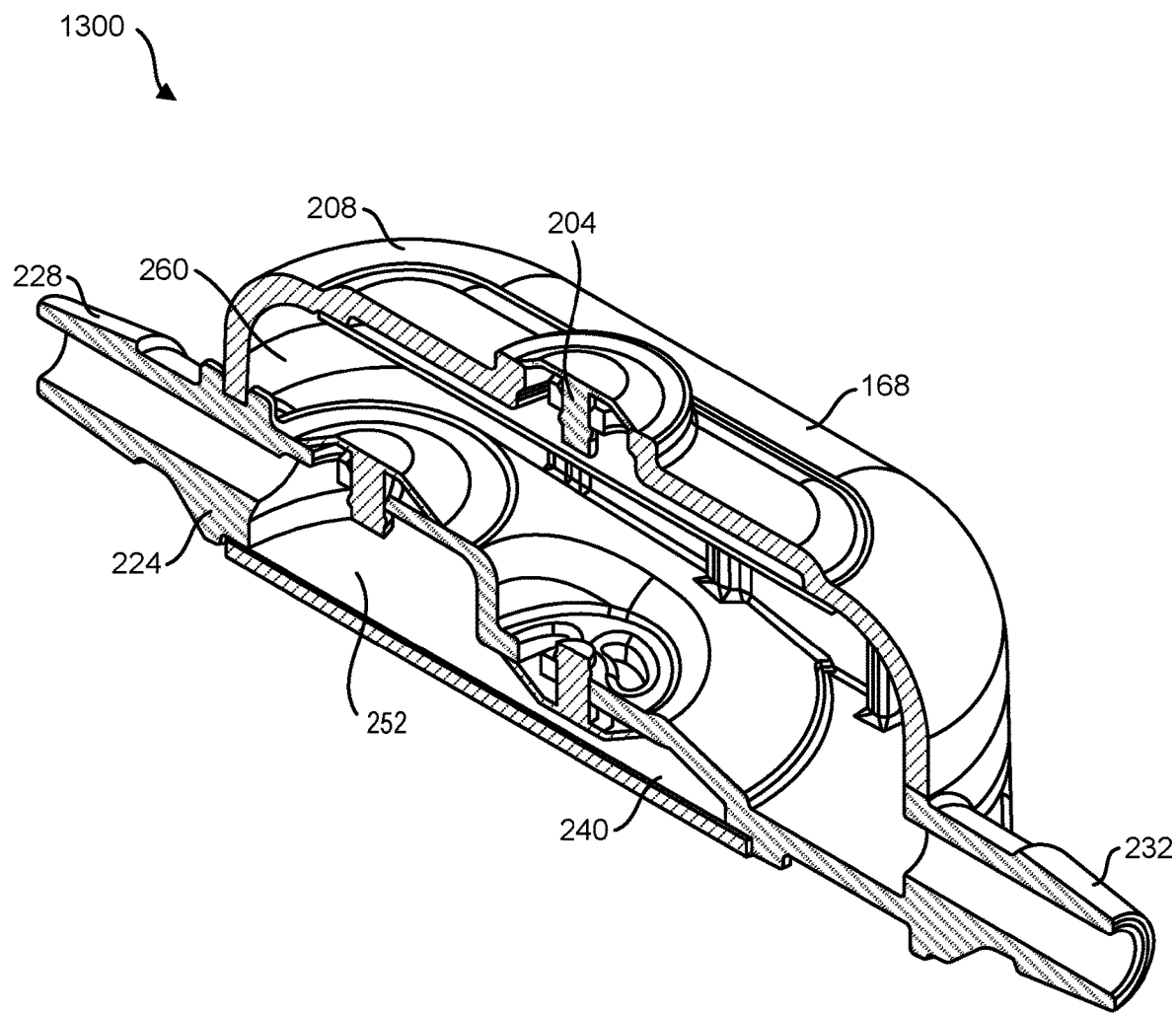
FIG. 13 is a diagram illustrating a perspective cross section view of the first bubble trap configuration.
Figure 14:
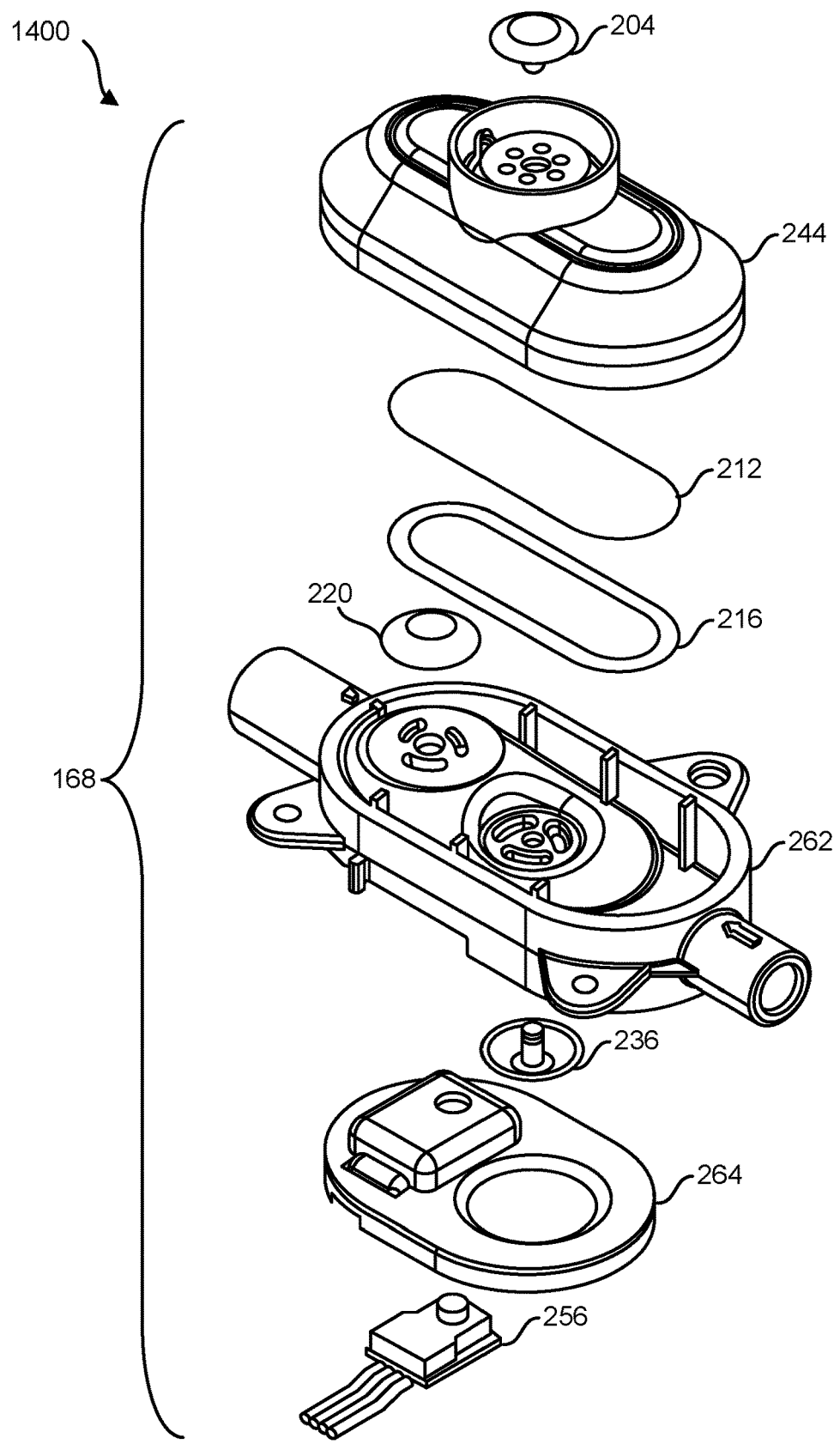
FIG. 14 is a diagram illustrating an exploded view of a second bubble trap configuration.
Figure 15:
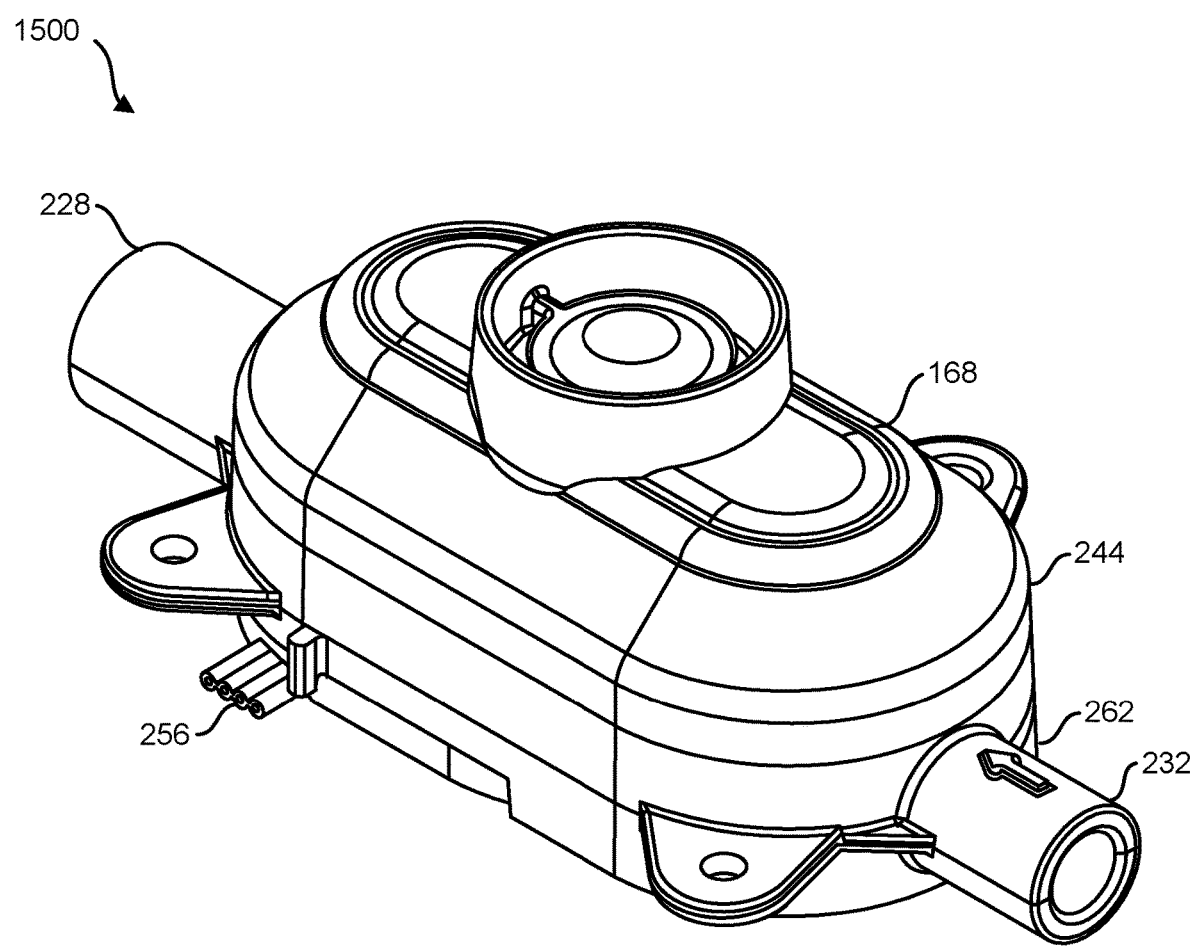
FIG. 15 is a diagram illustrating a perspective view of the second bubble trap configuration.
Figure 16:
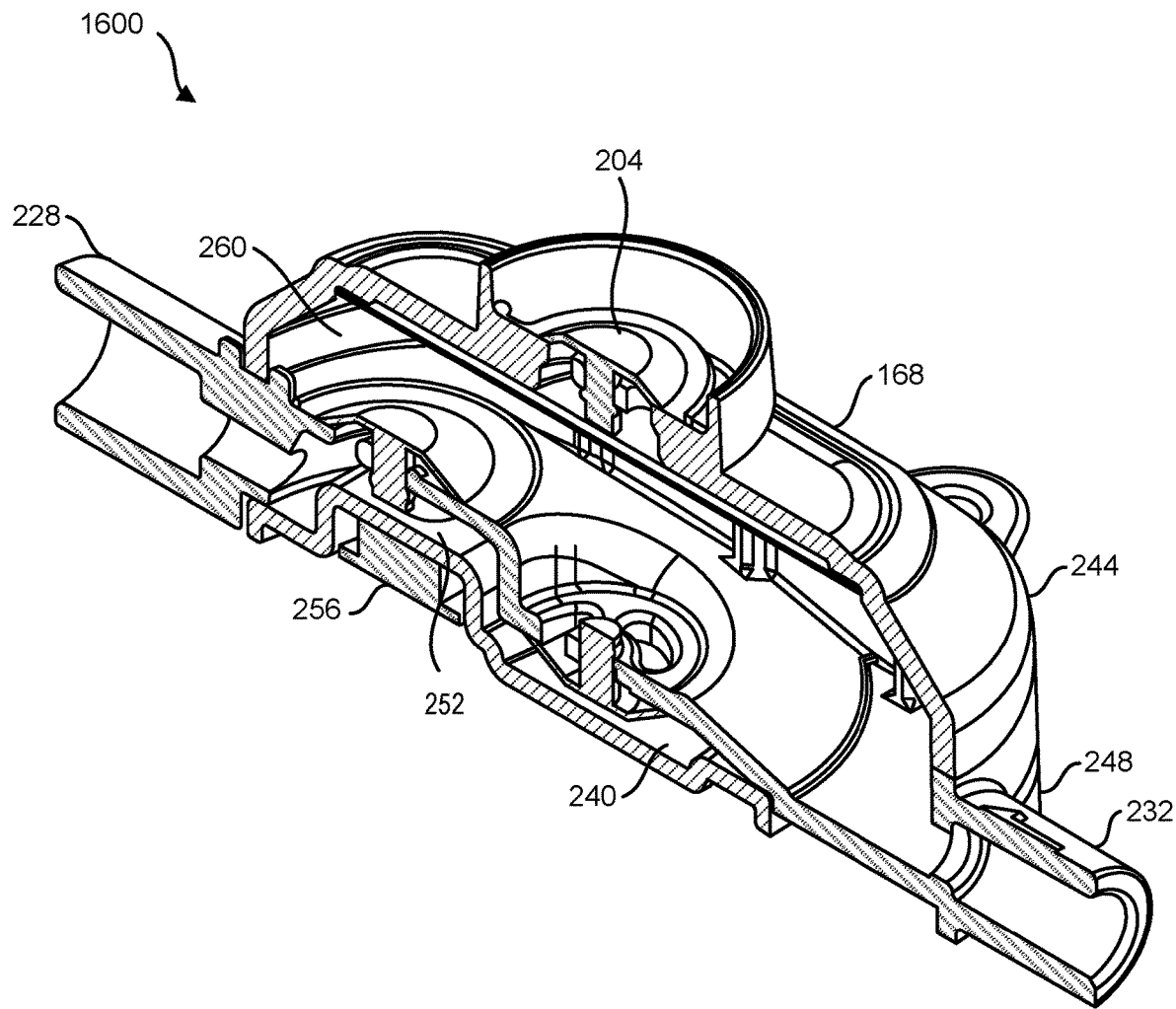
FIG. 16 is a diagram illustrating a perspective cross section view of the second bubble trap configuration.
Figure 17:
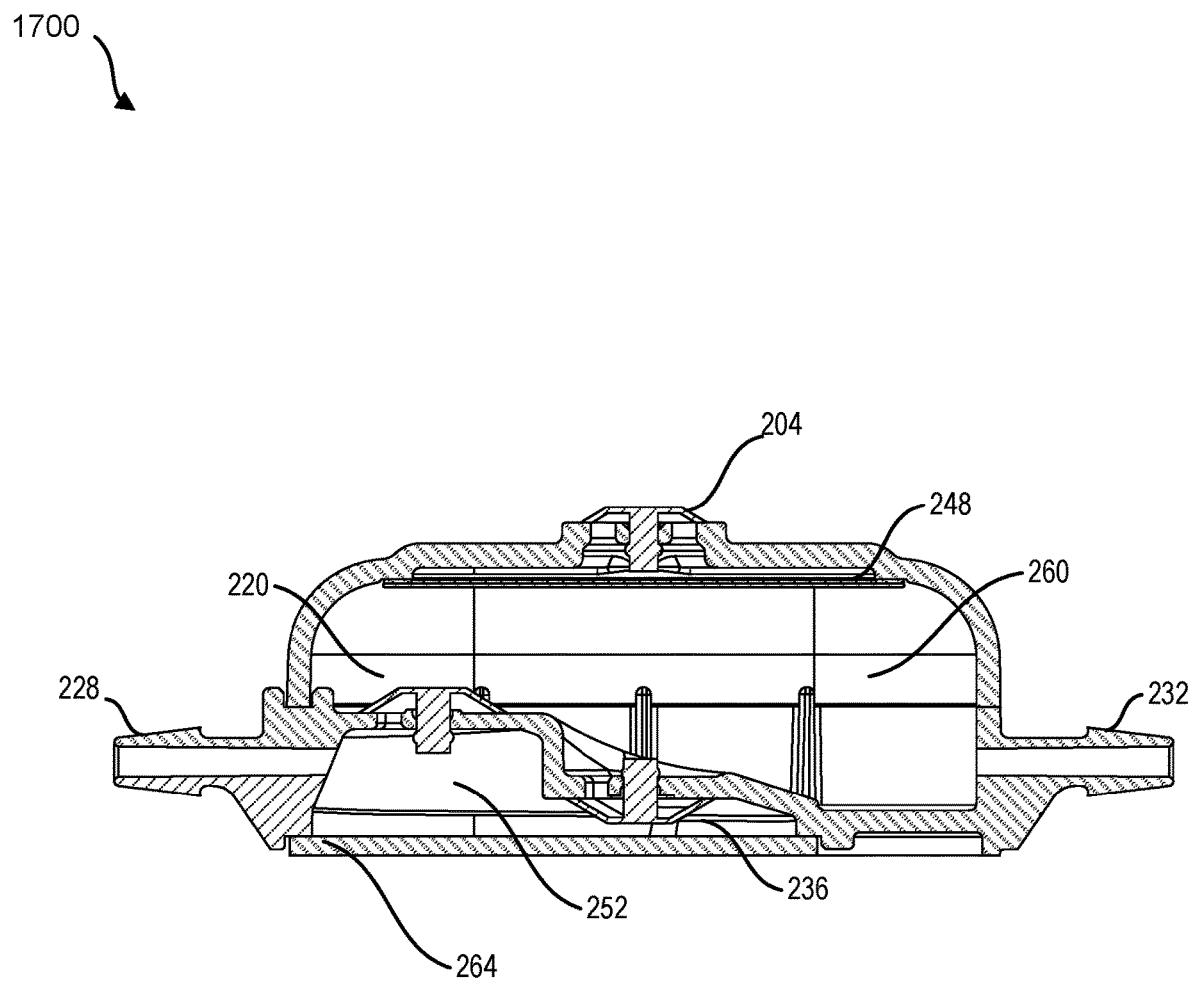
FIG. 17 is a diagram illustrating a cross section view of a bubble trap configuration.

FIGS. 11-16 are diagrams 1100-1600 illustrating various aspects of the bubble trap 168 with FIGS. 11-13 being directed to a first variation that does not include a pressure sensor and FIGS. 14-16 being directed to a second variation that includes a pressure sensor. FIG. 11 is an exploded view of the bubble trap 168 which illustrates various components including a first umbrella valve 204 (also referred to as an air vent valve ) and a second umbrella valve 220 (also referred to as a retrograde fluid valve) which can be both made from a material that is deformable such as silicone. A vent housing 208 provides structure for an upper portion of the bubble trap 168. A membrane 248 can be disposed within the vent housing 208 and secured to a manifold 224 by way of adhesive 216. The manifold 224 can include a first port 228 and a second port 232 through which perfusate can flow therethrough and the manifold 224 can sit on a base 240. A third umbrella valve 236 can be disposed on a lower portion of the manifold 224. FIG. 12 is a perspective view of the bubble trap 168 without the pressure sensor and FIG. 13 is a cross-sectional view of such bubble trap 168.

The bubble trap 168 with a pressure sensor as in diagrams 1400-1600 of FIGS. 14-16 includes similar components to that of the FIGS. 11-13 with a pressure sensor 256 disposed therein. To accommodate the pressure sensor 256, a different base 264 as well as manifold 262 and vent housing 244 can be utilized having a shape and size such that the pressure sensor 256 can interface with the second umbrella valve 236 to provide an indication of the pressure within the bubble trap 168. The pressure sensor 256 can take various forms including, for example, a pressure transducer which detects displacement of the second umbrella valve 236. FIG. 15 is a perspective view of the bubble trap 168 with the pressure sensor and FIG. 16 is a cross-sectional view of such bubble trap 168.

After the organ 152 is placed into the organ transport module 112 and affixed to the securing mechanism 148, the organ transport module 112 is placed within the inner housing 128, the lid 108 is secured, and the organ transport system is activated, for example, via the interface 120 (e.g., the user initiates an automated priming sequence, etc.). A pump within the organ transport system begins pumping fluid (i.e., perfusate, etc.) in the antegrade direction: from the fluid reservoir, through the pump, through whatever ancillary components may be present in the perfusion circuit 156, and into the bubble trap 168. As fluid is pumped from the reservoir, air from the perfusion circuit 156 enters the bubble trap at an inlet port 232, and into an upper interior chamber 260, and is vented through a hydrophobic membrane 248, and out through air vent valve 204 which opens automatically when subject to very small pressures. The antegrade fluid valve 236 can be configured to open at a higher pressure than that for the air vent valve 204. Because of this higher opening pressure, pressure initially builds in the upper interior chamber 260 until the air vent valve 204 opens. This pressure is also needed to expel air across the hydrophobic membrane 248. Pressure does not build further (and open the antegrade fluid valve 236) until liquid fills the upper chamber and contacts the hydrophobic membrane 248. When fluid begins to enter the inlet port 232, it enters the upper interior chamber 260 and displaces air there which continues to be vented as before. When the upper interior chamber 260 is full of fluid and all air in the upper interior chamber 260 has been vented out, the air vent valve 204 closes because fluid is unable to pass through the hydrophobic membrane 248 and so the fluid is not able to pressurize air on the opposite side of the hydrophobic membrane 248.

With the upper interior chamber 260 full of fluid, pressure begins to build until the antegrade fluid valve 236 opens, resulting in a measurable change in pressure which is detected by a pressure sensor, causing the perfusion system to stop the pump before a significant amount of air can be pumped toward the organ. The pressure sensor can be located in the 'Lower Interior Chamber'. Upper and Lower Chambers are in fluid communication with one another via the second and third umbrella valves. Second valve allowing uni-directional antegrade flow from the upper chamber. Third valve allowing uni-directional retrograde flow into the upper chamber.

The system then reverses the pump and begins slowly pumping in a retrograde direction, causing a pressure drop inside the upper interior chamber 260 of the bubble trap 168, causing the retrograde fluid valve 220 to open. With the retrograde fluid valve 220 open, air from the tubing line that connects the bubble trap to the organ begins to enter the lower interior chamber 252 and enters the upper interior chamber 260 through the retrograde fluid valve 220. The upper interior chamber 260 can be sized to hold all of the air from the tubing that connects to the organ 156.

When the air sensor (which can be located downstream during antegrade flow from the bubble trap and before the connector for the adapter cannula) detects that air is no longer present in the tubing that connects the bubble trap to the organ, the pump continues briefly to ensure all air is captured in the bubble trap and then reverses back to antegrade flow to begin normal perfusion. The positive pressure created inside of the bubble trap due to the opening pressure of the antegrade fluid valve 236, causes the air to be vented out through the hydrophobic membrane 248 and out the air vent valve 204 which has a lower opening pressure than the antegrade fluid valve 236. Once initial priming and de-airing of the circuit is complete, the pressure differential (created by the different opening pressures) is critical to the venting of bubbles which may accumulate at the membrane during normal operation and fluid flow through the bubble trap. Without sufficient 'driving' pressure, the bubbles will just sit against the membrane and not pass through.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An organ preservation system comprising:
a housing;
an organ perfusion circuit disposed within the housing;
a dual direction bubble trap disposed within the organ perfusion circuit comprising:
an inlet port positioned in line with the organ perfusion circuit;
an upper interior chamber to receive fluid entering the inlet port and formed within a vent housing;
a lower interior chamber separate from the upper interior chamber that is fluidically connected to the upper interior chamber and formed within the vent housing;
an air vent valve on an outer portion of an outer surface of the dual direction bubble trap; and
a hydrophobic membrane disposed between the upper interior chamber and the air vent valve;
a bi-directional fluid pump; and
a controller coupled to the bi-directional fluid pump configured to send signals to cause the bi-directional fluid pump to pump fluid in a retrograde direction through the organ perfusion circuit and to send signals to cause the bi-directional fluid pump to pump fluid in an antegrade direction through the organ perfusion circuit;
wherein, during operation, when fluid is pumped by the fluid pump into the dual direction bubble trap from either the retrograde or the antegrade direction, air passes through the hydrophobic membrane and is vented through the air vent valve until such time that the upper interior chamber is full of fluid which causes the air vent valve to close.

2. The system of claim 1, wherein the dual direction bubble trap further comprises: an antegrade fluid valve on a bottom portion of the vent housing which is configured to open, and allow flow into the lower interior chamber, when fluid is pumped in the antegrade direction and an amount of fluid within the upper interior chamber is above a threshold.

3. The system of claim 2, wherein air bubbles that collect on the hydrophobic membrane are forced through the hydrophobic membrane and vented to atmosphere when the antegrade fluid valve is opened.

4. The system of claim 3 further comprising: a pressure sensor in the lower interior chamber coupled to the controller and configured to detect a change in pressure caused by the antegrade fluid valve opening.

5. The system of claim 4, wherein the detection of the change in pressure by the pressure sensor causes the pump to stop pumping fluid.

6. The system of claim 5, wherein the pump causes the direction of fluid flow to subsequently reverse in the retrograde direction after the pump stops pumping fluid in response to a detected change in pressure by the pressure sensor.

7. The system of claim 6, wherein the dual direction bubble trap further comprises: a retrograde fluid valve positioned in a supporting wall within the vent housing separating the lower interior chamber and the upper interior chamber which is configured to open and allow flow, from the lower interior chamber to the upper interior chamber, when fluid is pumped by the fluid pump in the retrograde direction.

8. The system of claim 7 further comprising:
an air sensor coupled to the controller configured to detect air bubbles during perfusion.

9. The system of claim 8, wherein if a level of bubbles above a pre-defined threshold is detected by the air sensor, a signal is sent to the fluid pump from the controller causing the fluid pump to cease pumping fluid in the antegrade direction and reverse fluid pumping in the retrograde direction until the air bubbles are removed by the bubble trap.

10. An organ preservation system comprising:
a housing;
an organ perfusion circuit disposed within the housing;
a bi-directional fluid pump;
a controller coupled to the bi-directional fluid pump configured to send signals to cause the bi-directional fluid pump to pump fluid in a retrograde direction through the organ perfusion circuit and to send signals to cause the bi-directional fluid pump to pump fluid in an antegrade direction through the organ perfusion circuit; and
a dual direction bubble trap disposed within the organ perfusion circuit comprising means for venting air within the organ perfusion circuit.

11. An organ preservation system comprising:
a housing;
an organ perfusion circuit disposed within the housing;
a bi-directional fluid pump;
a controller coupled to the bi-directional fluid pump configured to send signals to cause the bi-directional fluid pump to pump fluid in a retrograde direction through the organ perfusion circuit and to send signals to cause the bi-directional fluid pump to pump fluid in an antegrade direction through the organ perfusion circuit; and
a dual direction bubble trap disposed within the organ perfusion circuit that is configured to selectively vent air within the organ perfusion circuit.

12. The system of claim 11, wherein the bubble trap comprises:
an upper interior chamber defined by a vent housing;
a lower interior chamber defined within the vent housing and fluidically coupled to the upper interior chamber;
an air vent valve on an outer portion of an outer surface of the dual direction bubble trap; and
venting means disposed between the upper interior chamber and the air vent valve;
wherein, during operation, when fluid is pumped by the fluid pump into the dual direction bubble trap from either the retrograde or the antegrade direction, air passes through the venting means and is vented through the air vent valve until such time that the upper interior chamber is full of fluid which causes the air vent valve to close.

13. The system of claim 12, wherein the dual direction bubble trap further comprises: an antegrade fluid valve on a bottom portion of the vent housing which is configured to open, and allow flow into the lower interior chamber, when fluid is pumped in the antegrade direction and an amount of fluid within the upper interior chamber is above a threshold.

14. The system of claim 13, wherein air bubbles that collect on the membrane are forced through the venting means and vented to atmosphere when the antegrade fluid valve is opened.

15. The system of claim 14 further comprising: a pressure sensor coupled to the controller in the lower interior chamber configured to detect a change in pressure caused by the antegrade fluid valve opening.

16. The system of claim 15, wherein the detection of the change in pressure by the pressure sensor causes the fluid pump to stop pumping fluid.

17. The system of claim 16, wherein the fluid pump causes the direction of fluid flow to subsequently reverse in the retrograde direction after the fluid pump stops pumping fluid in response to a detected change in pressure by the pressure sensor.

18. The system of claim 17, wherein the dual direction bubble trap further comprises: a retrograde fluid valve positioned in a supporting wall within the vent housing separating the lower interior chamber and the upper interior chamber which is configured to open and allow flow, from the lower interior chamber to the upper interior chamber, when fluid is pumped by the fluid pump in the retrograde direction.

19. The system of claim 18 further comprising:
   an air sensor coupled to the controller configured to detect air bubbles during perfusion.

20. The system of claim 19, wherein if a level of bubbles above a pre-defined threshold is detected by the air sensor, a signal is sent to the fluid pump from the controller causing the fluid pump to cease pumping fluid in the antegrade direction and reverse fluid pumping in the retrograde direction until the air bubbles are removed by the bubble trap.

* * * * *